(12) United States Patent
Suzuki

(10) Patent No.: US 9,878,275 B2
(45) Date of Patent: Jan. 30, 2018

(54) AIR CLEANER

(71) Applicant: TOYOTA BOSHOKU KABUSHIKI KAISHA, Aichi-ken (JP)

(72) Inventor: Yuji Suzuki, Kariya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 103 days.

(21) Appl. No.: 14/937,071

(22) Filed: Nov. 10, 2015

(65) Prior Publication Data

US 2016/0144311 A1    May 26, 2016

(30) Foreign Application Priority Data

Nov. 25, 2014  (JP) ................................ 2014-238096

(51) Int. Cl.
*B01D 46/52* (2006.01)
*B01D 46/10* (2006.01)

(52) U.S. Cl.
CPC ........... *B01D 46/523* (2013.01); *B01D 46/10* (2013.01); *B01D 2265/06* (2013.01)

(58) Field of Classification Search
CPC ...... B01D 29/00; B01D 29/01; B01D 29/038; B01D 2201/12; B01D 35/30
USPC .... 55/498, 502, 521, 529, 497, 500, DIG. 5, 55/499, 501, DIG. 31; 210/249, 493.3, 210/445, 446, 451, 493.2, 493.5, 941
See application file for complete search history.

(56) References Cited

U.S. PATENT DOCUMENTS 3,280,985 A * 10/1966 Czerwonka ............ B01D 29/07
210/489
4,126,557 A * 11/1978 Hodgkins .............. B01D 35/30
210/249
4,452,619 A *  6/1984 Wright .................. B01D 27/06
210/493.5
5,273,560 A * 12/1993 Kadoya ................ B01D 29/012
210/493.2
5,376,270 A * 12/1994 Spearman ............ B01D 29/012
210/445
5,744,036 A *  4/1998 Choi ................... B01D 29/012
156/292
5,792,229 A *  8/1998 Sassa ................. B01D 46/0001
55/497

(Continued)

FOREIGN PATENT DOCUMENTS

JP      2002-48015     2/2002
JP      2013-517930    5/2013

OTHER PUBLICATIONS

Office Action issued in Japan Counterpart Patent Appl. No. 2014-238096, dated Nov. 7, 2017, along with an English translation thereof.

*Primary Examiner* — Duane Smith
*Assistant Examiner* — Minh-Chau Pham
(74) *Attorney, Agent, or Firm* — Greenblum & Bernstein, P.L.C.

(57) ABSTRACT

An air cleaner includes a housing, a pleated filter element, and a spacing piece. The filter element is accommodated in the housing. The spacing piece is arranged between an inner surface of the housing and one of the pleats of the filter element that is located at an end of the filter element. The spacing piece maintains a space between the inner surface of the housing and the one of the pleats located at the end of the filter element.

6 Claims, 5 Drawing Sheets

(56) References Cited

U.S. PATENT DOCUMENTS

| | | | |
|---|---|---|---|
| 7,875,094 B2 * | 1/2011 | Baumann | B01D 46/523 173/71 |
| 8,137,427 B2 * | 3/2012 | Bouhanna | B01D 46/0005 55/497 |
| 2011/0186504 A1 | 8/2011 | Rocklitz | |
| 2013/0305930 A1 * | 11/2013 | Oh | B01D 46/0002 96/385 |
| 2014/0246383 A1 | 9/2014 | Puglia et al. | |

* cited by examiner

Combustion Chamber

AIR CLEANER

BACKGROUND ART

The present invention relates to an air cleaner arranged in an air passage of a vaporized fuel processing system.

Japanese Laid-Open Patent Publication No. 2002-48015 discloses an air cleaner arranged in an air passage of a vaporized fuel processing system.

The air cleaner disclosed in the publication includes a pleated filter element that is accommodated in a housing. The filter element filters the air that flows through the housing.

In the air cleaner, when a pleat of the filter element comes into contact with the inner surface of the housing, the flow of air will be hindered at the portion where the pleat contacts the housing. This leads to insufficient filtering and lowers the filtering performance. In particular, the pressure difference between the upstream and downstream sides of the filter element would be small when the air cleaner is connected to a passage that supplies air to a canister that temporarily holds vaporized fuel. In such a case, the suction force that acts on the filter element would be subtle. Thus, there would be no constraint on the movement and deformation of the filter element, and contact of the pleat with the inner surface of the housing would easily occur.

It is an object of the present invention to provide an air cleaner that allows the filtering performance of the element to be maintained with an extremely simple structure.

To achieve the above object, an air cleaner includes a housing, a pleated filter element accommodated in the housing, and a spacing member arranged between an inner surface of the housing and one of the pleats of the filter element that is located at an end of the filter element. The spacing member maintains a space between the inner surface of the housing and the one of the pleats located at the end of the filter element.

In the above structure, the spacing member maintains a space between the inner surface of the housing and the one of the pleats located at the end of the filter element. This ensures the flow of air and maintains the filtering performance of the air cleaner.

EMBODIMENTS OF THE INVENTION

One embodiment of the present invention will now be described.

Figure 1:
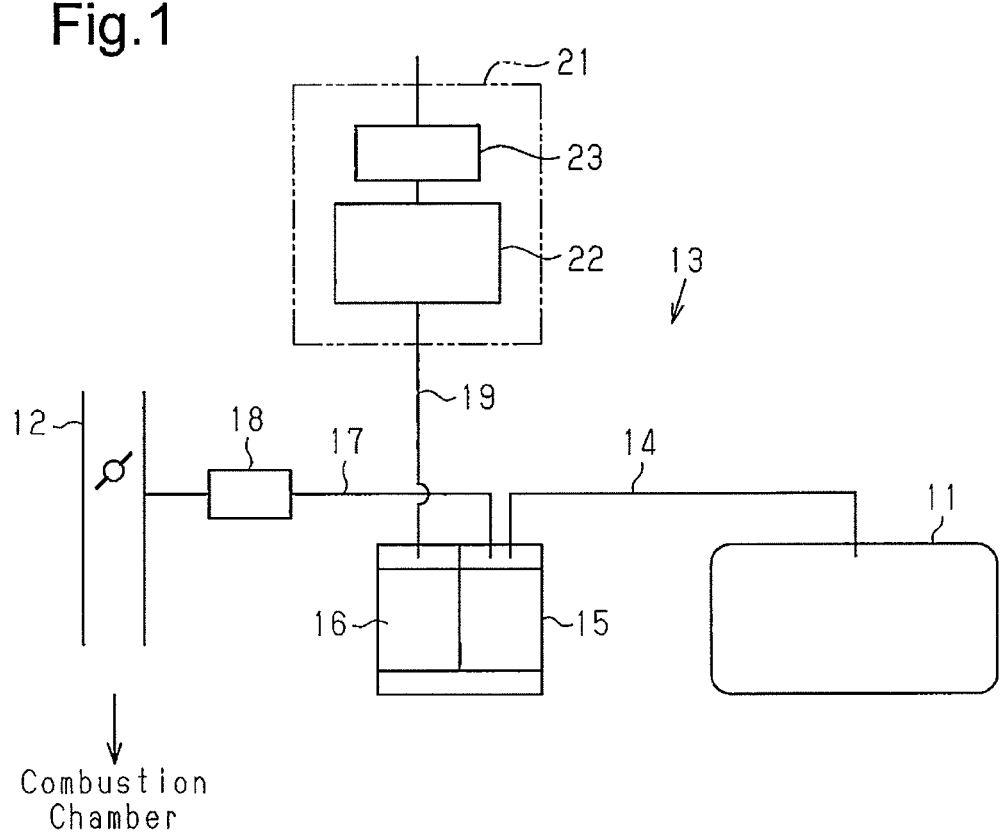
FIG. 1 is a schematic diagram of a vaporized fuel processing system.

Referring to FIG. 1, a vehicle engine (not shown) includes a vaporized fuel processing system (hereafter, referred to as the processing system 13) that draws vaporized fuel from a fuel tank 11 into an intake passage 12 of the engine and processes the vaporized fuel. A fuel supply line (not shown), which includes a fuel pump, extends between the fuel tank 11 and fuel injectors of the engine.

A vapor passage 14 connects the upper side of the fuel tank 11 to an inlet of a canister 15. The canister 15 accommodates an adsorbent 16 that adsorbs and holds fuel components. The canister 15 includes an outlet that is connected to the intake passage 12 by a purge passage 17. A control valve 18 is arranged in the purge passage 17. The control valve 18, which opens and closes the purge passage 17, controls the open degree of the purge passage 17. An air supply passage 19 is connected to the canister 15 to draw air into the canister 15.

When the control valve 18 opens while the engine is running, the processing system 13 uses the negative pressure in the intake passage 12 to draw gas from the canister 15 through the purge passage 17 and into the intake passage 12 and to draw air into the canister 15 through the air supply passage 19. This separates fuel components from the adsorbent 16. The fuel components are mixed with air to form purge gas, which is drawn into the intake passage 12. In this manner, fuel components are separated from the canister 15 and purge gas is drawn into the intake passage 12 to restore the capability of the canister 15 to adsorb fuel components. The combustion chambers of the engine burn and process the purge gas that is drawn into the intake passage 12.

The air supply passage 19 is connected to a cleaner module 21 that includes a known detector 22 and an air cleaner 23. The detector 22 detects leakage of vaporized fuel from the fuel tank 11. The air cleaner 23 filters the air drawn into the detector 22 and the canister 15.

The air cleaner 23 will now be described in detail.

Figure 2:
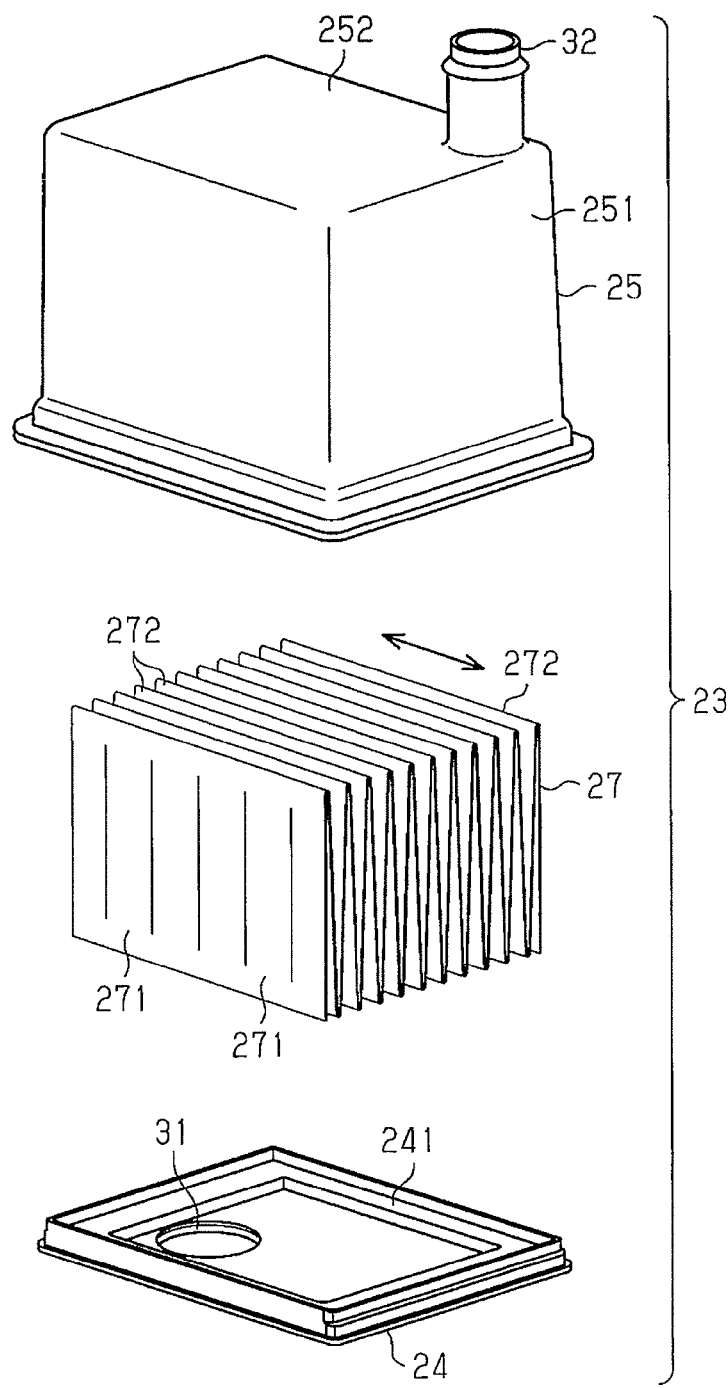
FIG. 2 is an exploded perspective view showing one embodiment of an air cleaner.
Figure 3:
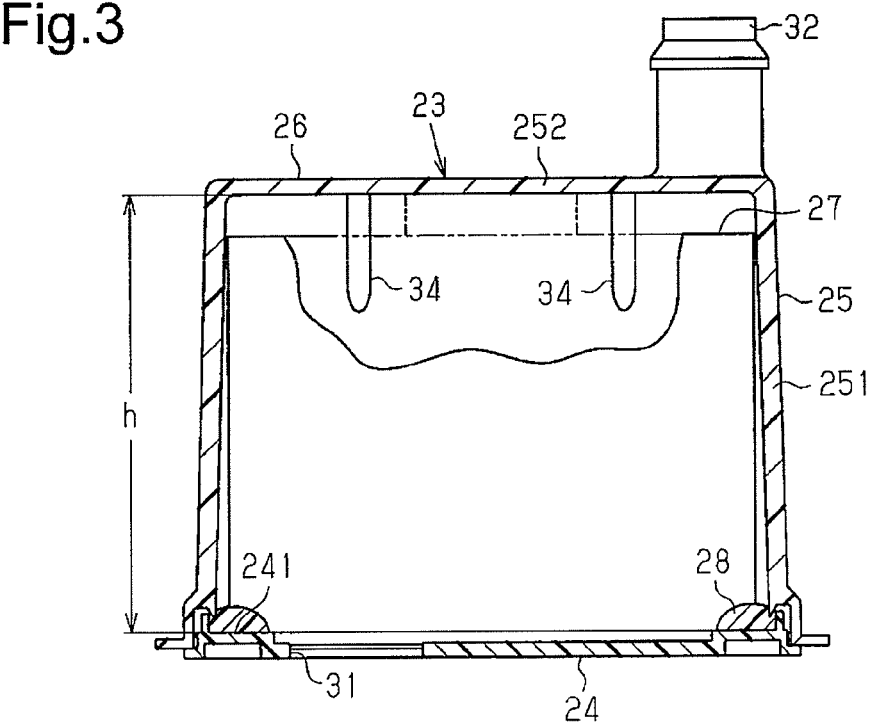
FIG. 3 is a cross-sectional view of the air cleaner shown in FIG. 2.
Figure 4:
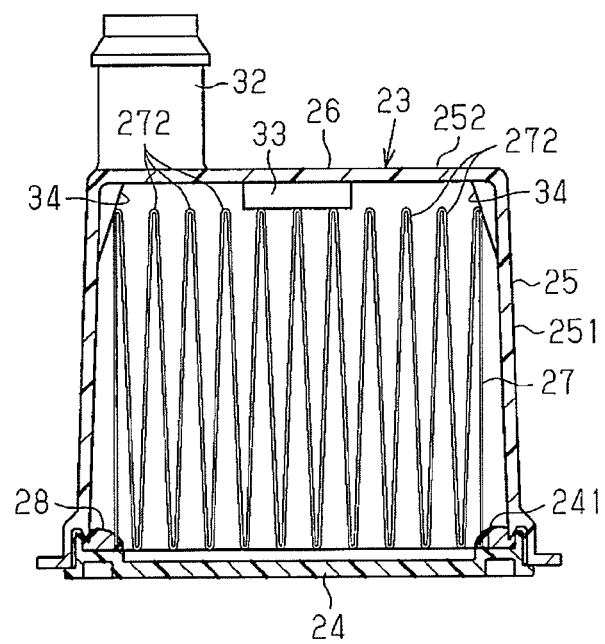
FIG. 4 is a cross-sectional view of a portion of the air cleaner that is not shown in FIG. 3.

As shown in FIGS. 2 to 4, the air cleaner 23 is provided with a housing 26 that includes a first casing 24, which is substantially flat, and a second casing 25, which is a box arranged on the first casing 24. The first casing 24 and the second casing 25 are each formed from a hard synthetic resin. The box-shaped second casing 25 includes a cavity defined by a peripheral wall 251 and a top wall 252. The first casing 24 closes the cavity of the second casing 25.

Figure 7:
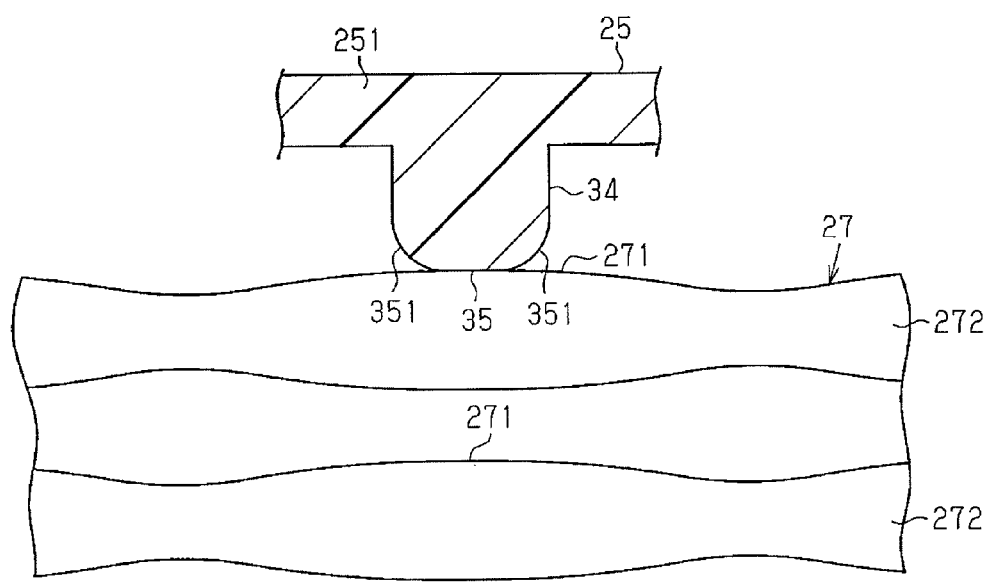
FIG. 7 is a cross-sectional view showing a portion of a spacing piece.

The housing 26 accommodates a filter element (hereafter, referred to as the element 27). The first casing 24 includes a peripheral portion defining a tetragonal setting surface 241. The element 27 is set on the setting surface 241. A sealing material 28 seals the gap between the element 27 and the setting surface 241 of the first casing 24 and adheres the element 27 to the first casing 24. The sealing material 28 is formed by a hot melt adhesive. The element 27 is formed by a sheet of filtering paper, the main component of which is natural fibers. The filtering paper is entirely folded into pleats 272. As shown in FIG. 7, the pleats 272 include bulges 271 that form pits and valleys to increase the filtering area of the element 27. Openings formed at the two sides (left and right sides as viewed in FIG. 3) are closed by seals (not shown).

The sealing material 28 seals the gap between the first casing 24 and the second casing 25.

The first casing 24 has a bottom portion that includes a circular first port 31. The first port 31 is connected to the canister 15 by the detector 22 and the air supply passage 19. The top wall 252 of the second casing 25 includes a second port 32. The second port 32 and the first port 31 are located at substantially diagonal positions. Further, the second port 32 is in communication with the atmosphere through the air supply passage 19.

A spacer 33 is attached to the inner central portion of the top wall 252 in the second casing 25. The spacer 33 is formed from a porous material, for example, a non-woven fabric. Further, the spacer 33 is forced against the top central part of the element 27.

Figure 5:
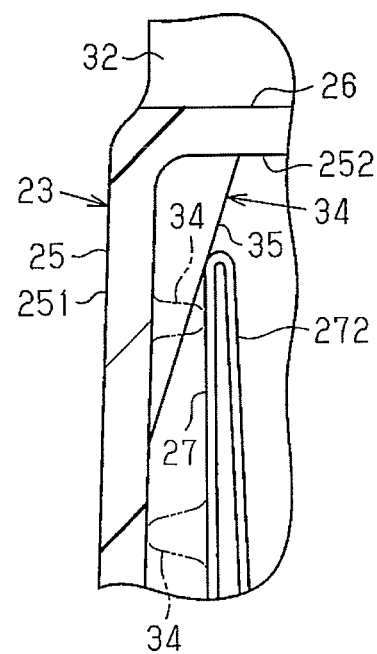
FIG. 5 is a cross-sectional view of a portion of the air cleaner shown in FIG. 2.
Figure 6:
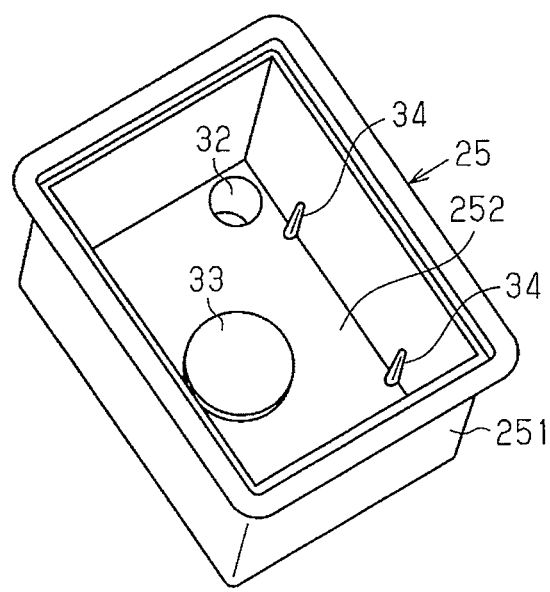
FIG. 6 is a perspective view showing the inner side of a second casing.

Referring to FIGS. 4 to 6, the peripheral wall 251 includes two opposing surfaces extending from the long sides of the top wall 252, which is rectangular. Two spacing pieces 34, which serve as spacing members, project from each of the two opposing surfaces of the peripheral wall 251 inside the second casing 25. Each spacing piece 34 extends from the upper portion of the peripheral wall 251 to the top wall 252. The peripheral wall 251 has a height h, and the spacing pieces 34 extend vertically at the upper side of the peripheral wall 251 over one third to one fourth of the height h, as viewed in FIG. 3. Each spacing piece 34 has an inclined surface 35 that is inclined so that the end surface opposed to the element 27 becomes closer to the inner surface of the second casing 25 as the first casing 24, or the bottom portion of the element 27, becomes closer. As shown in FIGS. 5 and 7, the bulges 271 in the peaks of the pleats 272 that are located at the two ends of the element 27 are abut against the corresponding inclined surfaces 35. The two widthwise edges of the inclined surface 35 are rounded and define rounded portions 351.

The operation of the present embodiment will now be described.

When the control valve 18 is open and the pressure of the canister 15 is low, air is drawn into the housing 26 through the second port 32. The element 27 filters the drawn in air. The filtered air is guided through the first port 31 into the canister 15 and drawn into the intake passage 12 together with vaporized fuel.

In this case, the peaks of the pleats 272 located at the two ends of the element 27 in a direction orthogonal to the ridge line of each pleat 272 abut against the corresponding spacing pieces 34. Thus, the pleats 272 located at the two ends of the element 27 do not come into planar contact with the inner surface of the second casing 25. This maintains gaps between the pleats 272 and the inner surface of the second casing 25. Accordingly, the element 27 has a large filtering area that obtains a high filtering efficiency.

The present embodiment has the advantages described below.

(1) The filtering portion of the element 27 does not come into contact with the inner surface of the housing 26. Thus, the filtering portion remains open. Accordingly, the element 27, that is, the air cleaner 23, obtains a high filtering efficiency.

(2) As described above, the air cleaner 23 has a high filtering efficiency. This allows the air cleaner 23 to be reduced in size and reduces limitations that would be imposed due to the air cleaner 23 when installed in the engine compartment. This increases the freedom of design for the layout of components in the engine compartment.

(3) The spacing pieces 34 are formed integrally with the second casing 25 of the housing 26. This simplifies the structure of the air cleaner 23 without increasing the number of components.

(4) The spacing pieces 34 are arranged on the upper inner surface of the peripheral wall 251. This forms a gap below the spacing pieces 34. The gap allows air to flow smoothly since there are no obstacles that interfere with the flow of air. This decreases the airflow resistance in the air cleaner 23 and increases the filtering efficiency.

(5) The spacing pieces 34 abut against the bulges 271 of the element 27. This enlarges the gap between the inner surface of the peripheral wall 251 and the pleats 272 of the element 27. This decreases the airflow resistance in the air cleaner 23 and increases the filtering efficiency, which is the same as advantage (4).

(6) The inclined surfaces 35 of the spacing pieces 34 hold the element 27. Thus, the spacing pieces 34 properly hold the pleats 272 of the element 27 even when there is an error in the shape of the element 27 or when the element 27 gradually changes in shape and size due to wear.

(7) Each of the two widthwise edges of the inclined surface 35 is rounded to define the rounded portion 351. If the two edges of the inclined surface 35 are cornered and the element 27 is softened due to wear, the corners of the spacing piece may get caught in the element 27 and dent the element 27. The rounded portions 351 allow such a situation to be avoided.

The above embodiment may be modified as described below.

Each spacing piece 34 may be changed in shape. For example, as shown by the broken line in FIG. 5, the spacing piece 34 may be shaped as a projection.

Further, as shown by the broken line in FIG. 5, the spacing piece 34 may be formed on the element 27.

The invention claimed is:

1. An air cleaner comprising:
a housing;
a pleated filter element accommodated in the housing;
a spacing member arranged between an inner surface of the housing and one of the pleats of the filter element that is located at an end of the filter element, wherein the spacing member maintains a space between the inner surface of the housing and the one of the pleats located at the end of the filter element,
wherein the spacing member is formed integrally with the inner surface of the housing,
wherein at least a portion of the spacing member is located at a position above a peak of the one of the pleats located at the end of the filter element.

2. The air cleaner according claim 1, wherein
the spacing member includes an end surface opposed to the filter element, and
the end surface includes an inclined surface that is inclined to become closer to the inner surface of the housing as a bottom portion of the filter element becomes closer.

3. The air cleaner according claim 1, wherein
the spacing member includes an end surface opposed to the filter element, and
the end surface of the spacing member includes two widthwise edges that are rounded.

4. The air cleaner according to claim 1, wherein the filter element includes a bulge that abuts against the spacing member.

5. The air cleaner according to claim 1, wherein the air cleaner is connected to a passage for air that is drawn into a canister.

6. The air cleaner according to claim 1, wherein the housing is defined by side walls that intersect a top wall to form an enclosure for the filter element, wherein
the spacer member is formed integrally on both the top wall and at least one of the side walls.

* * * * *